United States Patent Office 2,774,765
Patented Dec. 18, 1956

2,774,765

ESTERS OF 4-PHENYL-4-TETRAHYDROPYRAN-CARBOXYLIC ACID AND THEIR SALTS

William W. Jenkins, Morton Grove, Ill., assignor, by mesne assignments, to G. D. Searle & Co., Skokie, Ill., a corporation of Delaware No Drawing. Application May 10, 1954,
Serial No. 428,846

6 Claims. (Cl. 260—294.3)

The present invention relates to new drugs with valuable cardio-regulatory properties and, in particular, to certain esters of 4-phenyl-4-tetrahydropyrancarboxylic acid and their non-toxic salts. These esters can be represented by the structural formula

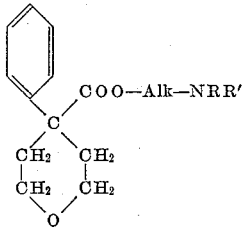

wherein Alk is a lower alkylene radical separating the oxygen and nitrogen atoms attached thereto by at least two carbon atoms and NRR' is a member of the class consisting of di-n-propylamino, diisopropylamino, di-(secondary butyl)amino, 2,5-dimethylpyrrolidino and 2,6-lupetidino radicals.

These compounds have a strong quinidine-like action on auricles. As stated in my copending application Serial No. 282,703, filed April 16, 1952, now abandoned, of which the present application is a continuation-in-part, the hydrochloride of the β-diisopropylaminoethyl ester was found to be about 4 times as active as quinidine when tested by the method of G. S. Dawes, described in the British Journal of Pharmacology, vol. 1, page 90, 1946. This result was quite unexpected since the hydrochloride of the corresponding β-diethylaminoethyl ester had proven to be only about 0.4 times as active as quinidine in the same test. Further investigation in this series has shown that certain additional, related esters share the high degree of activity shown by the β-diisopropylaminoethyl ester. Specifically, it was found that on replacement of the diisopropylamino group by a di-n-propylamino and di-sec.-butylamino group the activity was maintained. However, replacement of the isopropyl group by a higher alkyl group or by a butyl group which is not branched at the α- carbon atom such as an isobutyl group leads to a disappearance of the activity. The dialkylamino group can also be replaced by a 2,5-dimethylpyrrolidino or 2,6-lupetidino radical. However, it has been found that related nitrogen-containing heterocycles lacking the branched methyl groups at the α- carbon atom such as the N-pyrrolidino and N-morpholino derivatives are inactive.

The esters of this invention form salts with a variety of non-toxic, inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic sulfonic acids which provide anions which are non-toxic in therapeutic dosages. Among such esters are methyl chloride and bromide; ethyl chloride, propyl chloride, butyl chloride, isobutyl chloride, benzyl bromide, phenethyl bromide, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The following examples illustrate in detail certain of the compounds which comprise this invention and methods for their production. However, this invention is not to be construed as limited thereby in spirit or in scope. In these examples temperatures are given in degrees centigrade (° C.), relative amounts of materials in parts by weight, and pressures during vacuum distillations in millimeters (mm.) of mercury.

*Example 1*

A mixture of 480 parts of 4-phenyl-4-tetrahydropyrancarboxylic acid and 122 parts of thionyl chloride is heated at reflux temperature for 2 hours after which the excess of thionyl chloride is removed by vacuum distillation. The residue is dissolved in benzene, solvent stripped under vacuum and distilled at about 128–131° C. and 2 mm. pressure. 365 parts of the 4-phenyl-4-tetrahydropyrancarbonyl chloride thus obtained are mixed with a solution of 235 parts of β-hydroxyethyldiisopropylamine in 1300 parts of benzene and heated at reflux temperature for 10 hours. The precipitate is collected on a filter and dried in vacuo over sodium hydroxide. It is then dissolved in water and the aqueous solution is washed with ether, rendered alkaline and extracted with ether. This extract is washed with water, dried and the solvent is stripped. The β-diisopropylaminoethyl ester of 4-phenyl-4-tetrahydropyrancarboxylic acid is distilled at about 175–180° C. and 1.3 mm. pressure. It has the structural formula

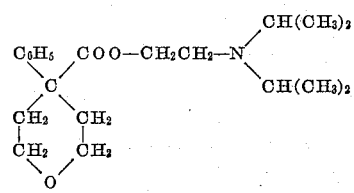

*Example 2*

140 parts of the above basic ester are dissolved in 2150 parts of anhydrous ether and treated with one equivalent of a 25% solution of hydrogen chloride in absolute 2-propanol. On standing at room temperature a white crystalline hydrochloride forms which, recrystallized from a mixture of ethyl acetate and 2-propanol, melts at about 147–148° C.

*Example 3*

415 parts of the β-diisopropylaminoethyl ester of 4-phenyl-4-tetrahydropyrancarboxylic acid are diluted with 1000 parts of chloroform and then heated with 58 parts of methyl bromide in a shielded pressure reactor at 80° C. for 3 hours. The reaction mixture is then stripped of solvent, suspended in 1800 parts of boiling ethyl acetate and dissolved by addition of 500 parts of absolute 2-propanol. On cooling the crystalline methobromide precipitates, which melts at about 173.5–174° C. with decomposition.

*Example 4*

A mixture of 449 parts of 4-phenyl-4-tetrahydropyrancarbonyl chloride and 246 parts of δ-diisopropylaminobutanol in 200 parts of xylene is heated at reflux temperature for 12 hours. The crude hydrochloride is collected on a filter, dried in vacuo and dissolved in water. The aqueous solution is washed with ether, rendered alkaline and extracted with ether. This extract is washed with water, dried, solvent stripped and distilled at about 180–187° C. and 1.1 mm. pressure. It has the structural formula

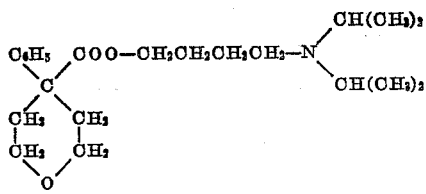

Example 5

A mixture of 460 parts of 4-phenyl-4-tetrahydropyrancarbonyl chloride, 334 parts of 1-diisopropylamino-2-propanol, and 2640 parts of benzene is refluxed for two hours. After cooling, the crystalline precipitate is collected by filtration. The filtrate is diluted with ether and extracted with water containing a small amount of hydrochloric acid. The aqueous extracts are combined, made alkaline and extracted thoroughly with ether. The ethereal extracts are combined, washed with water, dried over anhydrous sodium sulfate, and the solvent distilled. The oily residue is dissolved in 250 parts of anhydrous ether and to this solution is added a slight excess of a 25% solution of hydrogen chloride in 2-propanol. The resulting oil quickly granulates and the white crystalline product is then collected. After crystallizing from a mixture of 2-propanol and absolute ethyl acetate, the hydrochloride of the diisopropylamino-2-propyl ester of 4-phenyl-4-tetrahydropyrancarboxylic acid melts at about 167–170° C. It has the structural formula

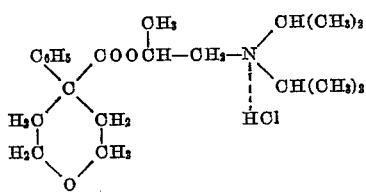

Example 6

A mixture of 206 parts of 4-phenyl-4-tetrahydropyrancarboxylic acid, 54 parts of sodium methoxide, 200 parts of β-chloroethyl-di-n-propylamine hydrochloride and 4000 parts of 2-propanol is refluxed for 5 hours and then permitted to stand at room temperature. A crystalline precipitate forms which is collected on a filter and taken up in water. The aqueous solution is rendered alkaline by addition of dilute sodium hydroxide and extracted with ether. This extract is washed with water, dried over anhydrous sodium sulfate, filtered and acidified with a slight excess of a 25% solution of hydrogen chloride in anhydrous 2-propanol. The hydrochloride of the β-di-n-propylaminoethyl ester of 4-phenyl-4-tetrahydropyrancarboxylic acid thus obtained is recrystallized from methanol and ether. It melts at about 183–184° C.

Example 7

A solution of 225 parts of 4-phenyl-4-tetrahydropyrancarbonyl chloride in 880 parts of dry benzene is mixed with 173 parts of di-(secondary butyl)aminoethanol and heated at reflux temperature for 30 minutes. The reaction mixture is treated with a large volume of ether whereupon an oil separates which quickly solidifies. This solid material is treated with a large volume of ether and a sufficient amount of aqueous sodium hydroxide to render the solution alkaline. The ether solution is washed repeatedly with water, dried over anhydrous sodium sulfate and freed from solvent and unreacted di-(secondary butyl)aminoethanol by vacuum distillation. The residual oil is dissolved in ether and treated with a slight excess of hydrogen chloride in 2-propanol. A solid hydrochloride is obtained which, recrystallized from ethyl acetate, melts at about 137–140° C. The salt of the β-di(secondary butyl)aminoethyl ester of 4-phenyl-4-tetrahydropyrancarboxylic acid thus obtained has the structural formula

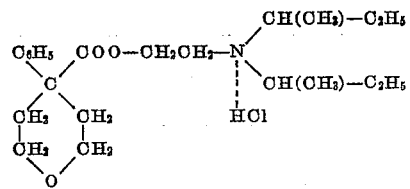

Example 8

A mixture of 143 parts of 1-(β-hydroxyethyl)-2,5-dimethylpyrrolidine, 225 parts of 4-phenyl-4-tetrahydropyrancarbonyl chloride and 800 parts of anhydrous benzene is heated at reflux for 45 minutes after which most of the solvent is removed under vacuum. The solid residue is taken up in methanol. The methanol solution is filtered and diluted with ether. The solid precipitate is collected on a filter and dried over anhydrous sodium hydroxide under vacuum. It is dissolved in water and the aqueous solution is washed with ether, rendered alkaline and extracted with ether. This extract is washed with water, dried and evaporated to yield the 2,5-dimethylpyrrolidinoethyl ester of 4-phenyl-4-tetrahydropyrancarboxylic acid as an orange oil. The compound has the structural formula

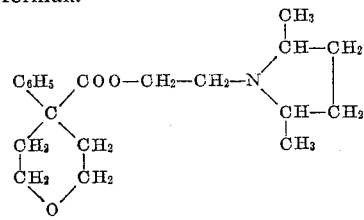

Example 9

Upon mixing of 157 parts of 1-(β-hydroxyethyl)-2,6-lupetidine and 225 parts of 4-phenyl-4-tetrahydropyrancarbonyl chloride in 800 parts of dry benzene, crystallization occurs immediately. The reaction mixture is refluxed for 30 minutes and then submitted to vacuum distillation to remove most of the benzene. The solid residue is dissolved in methanol and the methanolic solution is filtered and diluted with ether. The crystals thus obtained are dissolved in water and the aqueous solution is rendered alkaline by addition of dilute sodium hydroxide and extracted with ether. This extract is washed with water and dried over anhydrous sodium sulfate. The solvent is stripped and the residue is dissolved in dry ether and treated with an excess of hydrogen chloride in 2-propanol. The solid precipitate is recrystallized from methanol and ether. The hydrochloride of the β-(2,6-lupetidino)ethyl ester of 4-phenyl-4-tetrahydropyrancarboxylic acid thus obtained melts at about 175–179° C. It has the structural formula

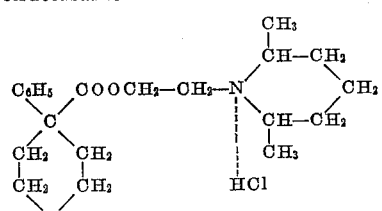

I claim:
1. A compound of the structural formula

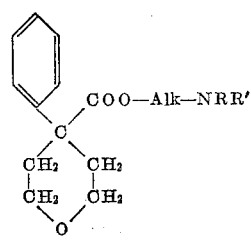

wherein Alk is a lower alkylene radical separating the oxygen and nitrogen atoms attached thereto by at least two carbon atoms and NRR' is a member of the class consisting of di-n-propylamino, diisopropylamino, di-(secondary butyl)amino, 2,5-dimethylpyrrolidino and 2,6-lupetidino radicals.

2. The β-diisopropylaminoethyl ester of 4-phenyl-4-tetrahydropyrancarboxylic acid.
tetrahydropyrancarboxylic acid.

3. The β-di-n-propylaminoethyl ester of 4-phenyl-4-tetrahydropyrancarboxylic acid.

4. The β-di(secondary butyl)aminoethyl ester of 4-phenyl-4-tetrahydropyrancarboxylic acid.

5. The β-(2,6-lupetidino)ethyl ester of 4-phenyl-4-tetrahydropyrancarboxylic acid.

6. The 2,5-dimethylpyrrolidinoethyl ester of 4-phenyl-4-tetrahydropyrancarboxylic acid.

References Cited in the file of this patent
UNITED STATES PATENTS 2,242,575   Eisleb _____ May 20, 1941

OTHER REFERENCES

Eisleb: Berichte, vol. 74B, pp. 1433–51 (1941).
Leffler et al.: JACS, vol. 55, pp. 365–70 (1932).